(12) United States Patent
Griessbaum et al.

(10) Patent No.: US 6,661,389 B2
(45) Date of Patent: Dec. 9, 2003

(54) HORN ANTENNA FOR A RADAR DEVICE

(75) Inventors: Karl Griessbaum, Muhlenbach (DE);
Josef Fehrenbach, Haslach (DE);
Jurgen Motzer, Gengenbach (DE);
Daniel Schultheiss, Hornberg (DE)

(73) Assignee: Vega Grieshaber KG (DE)

( * ) Notice: Subject to any disclaimer, the term of this patent is extended or adjusted under 35 U.S.C. 154(b) by 0 days.

(21) Appl. No.: 09/989,088

(22) Filed: Nov. 19, 2001

(65) Prior Publication Data

US 2002/0126061 A1 Sep. 12, 2002

Related U.S. Application Data

(60) Provisional application No. 60/247,711, filed on Mar. 12, 2001.

(30) Foreign Application Priority Data

Nov. 20, 2000 (DE) .......................................... 100 57 441

(51) Int. Cl.⁷ ............................................... H01Q 13/00
(52) U.S. Cl. ........................ 343/786; 343/785; 343/873
(58) Field of Search ............................... 343/785, 786, 343/772, 771, 873, 872; 333/21 A

(56) References Cited

U.S. PATENT DOCUMENTS

| | | | | |
|---|---|---|---|---|
| 3,389,394 | A | * 6/1968 | Lewis ......................... | 343/725 |
| 4,021,814 | A | * 5/1977 | Kerr et al. ................... | 343/786 |
| 4,161,731 | A | 7/1979 | Barr ............................ | 343/14 |
| 4,488,156 | A | * 12/1984 | DuFort et al. ............... | 343/754 |
| 4,673,947 | A | * 6/1987 | Newham .............. | 343/781 CA |
| 4,783,665 | A | 11/1988 | Lier et al. .................... | 343/786 |
| 5,200,757 | A | * 4/1993 | Jairam ......................... | 343/772 |
| 5,333,493 | A | * 8/1994 | Cutmore ...................... | 324/640 |
| 5,675,348 | A | * 10/1997 | Okada et al. ............. | 343/781 R |
| 5,952,984 | A | 9/1999 | Kuramoto et al. .......... | 343/753 |
| 6,014,110 | A | * 1/2000 | Bridges ....................... | 343/783 |
| 6,320,554 | B1 | * 11/2001 | Yuanzhu ..................... | 343/772 |
| 6,353,418 | B1 | * 3/2002 | Burger et al. ............. | 333/21 A |

FOREIGN PATENT DOCUMENTS

| | | | |
|---|---|---|---|
| DE | 3011195 | 10/1981 | .......... H01Q/13/04 |
| DE | 3814276 | 11/1989 | ............ H01Q/1/02 |
| DE | 9412243 | 11/1994 | ........... G01F/23/28 |
| DE | 4405855 | 8/1995 | .......... H01Q/13/24 |
| DE | 4443289 | 6/1996 | ............ H01P/5/00 |
| DE | 19617963 | 11/1997 | ......... G01F/23/284 |
| DE | 19800306 | 7/1999 | .......... H01Q/13/24 |
| JP | 57023303 | 2/1982 | .......... H01Q/13/02 |
| JP | 57124907 | 8/1982 | .......... H01Q/19/13 |
| JP | 62190903 | 8/1987 | .......... H01Q/13/02 |
| JP | 62264702 | 11/1987 | ............ H01Q/1/08 |
| JP | 63054807 | 3/1988 | .......... H01Q/13/02 |
| JP | 4301902 | 10/1992 | .......... H01Q/13/02 |
| JP | 4351983 | 12/1992 | ............. G01S/7/03 |
| JP | 10041737 | 2/1998 | .......... H01Q/13/02 |
| WO | 90/13927 | 11/1990 | .......... H01Q/19/08 |

OTHER PUBLICATIONS

"millitech", *Millimeter Wave Product*, 1995 by Millitech Corporation; 1995 Edition; Series DLH, pp. 29–30.

Technical Drawing, Applicant Label D20, Titled BM 70 Versuchsaufbau, by Krohne, Inc., (Mar. 3, 1989), 1 page.

Auflage, Funfte, et al., "Taschenbuch der Hochfrequenztechnik", *Meinke –Gundlach; Band 2; Komponenten*, Springer–Verlag, (1992), pp. 47–48 (English Translation Provided).

(List continued on next page.)

*Primary Examiner*—Tan Ho

(57) ABSTRACT

The invention relates to a horn antenna for a radar-filling level measuring device having an antenna envelope (3) that comprises a flaring hollow space (4) of the antenna, in which a filling (10) is present at least in part filling up said hollow space (4) of the antenna, and having an encasing (10, 20) of a dielectric material and enclosing the outside of the antenna envelope (3) and closing the opening (3a) of the hollow space of the hollow space (4) of the antenna.

26 Claims, 5 Drawing Sheets

OTHER PUBLICATIONS

Groenenboom, J., et al., "Data Processing for a Landmine Detection Dedicated GPR", (May 26, 2000), 6 pages.

Kolettis, N.J., "A Wideband Antenna Feed –A Dielectric Loaded Hybrid Mode Conical Horn", *Session IX –Large–Aperture Antennas*, 2:00 p.m., Wednesday, 131 Hitchcock Hall; Bell Telephone Laboratories, Inc. Whippany, N.J., 393–399.

Martin, A.G., "Symmetrical Low Cross–Polar Radiation from a Dielectric Sphere Loaded Horn", *IEEE Transactions on Antennas and Propagation*, vol. AP–27, No. 6, (Nov. 1979), 862–863.

Nair, R.A., et al., "Gain Enhancement in Dielectric Core Filled Multimode Conical Horn Antenna", 0–7803–1246–May 1993, 1993 IEEE, (May 1993), 1671–1674.

Salema, Carlos, et al., "SolidDielectric Horn Antennas", *Library of Congress Cataloging–in–Publication Data*, Artech House Antenna Library, (1998), 4 pages.

Toland, B, et al., "Design and Analysis of Arbitrarily Shaped Dielectric Antennas", *Microwave Journal*, Technical Feature, (May 1997), 278–286.

Yarovoy, A.G., et al., "Development of Dielectric Filled Tem–Horn", (Apr. 14, 2000), 4 pages.

Yarovoy, A.G., et al., "Ultra–Wideband Antennas for Ground Penetrating Radar", *Final Program, GPR 2000, Gold Coast, Australia*, Eighth International Conference on Ground Radar, (May 23, 2000), 6 pages.

\* cited by examiner

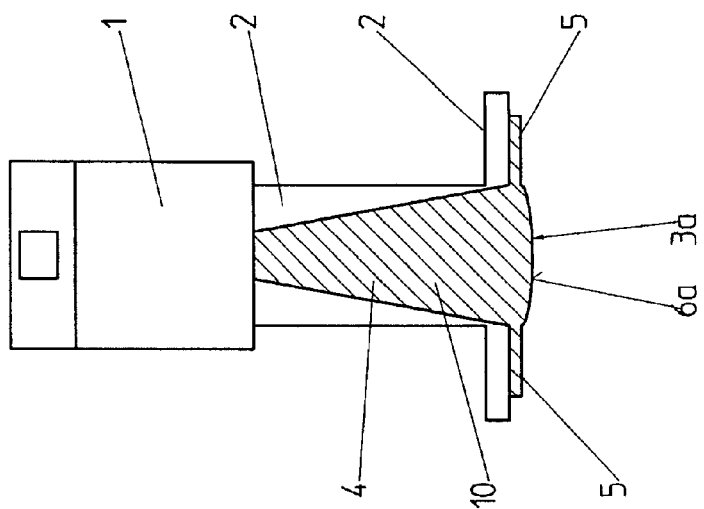
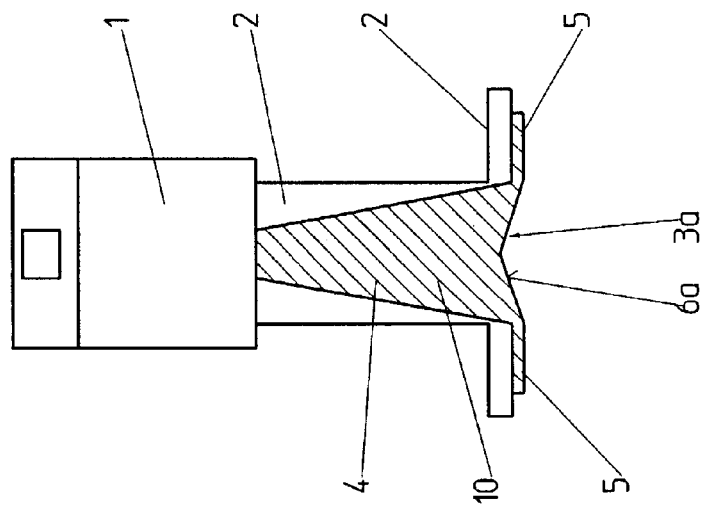
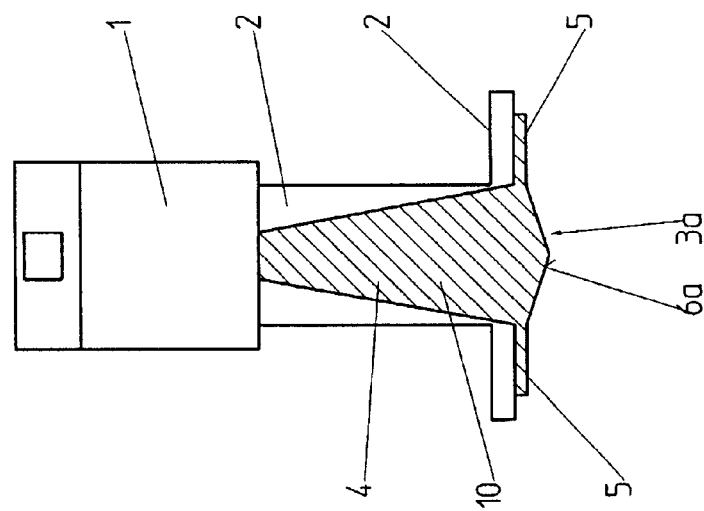

HORN ANTENNA FOR A RADAR DEVICE

This application claims the benefit of provisional application Serial No. 60/274,711, filed Mar. 12, 2001.

TECHNICAL FIELD

The invention relates to a horn antenna for a radar device such as, for example, a radar-filling level measuring device. By means of a horn antenna of this kind, known as such for a long time, which is also designated "cone antenna" in the English-language literature, microwaves are radiated, which have been generated by HF energy coupled in. To be precise, short microwave pulses are radiated. In a combined transmitting and receiving system of a level measuring device equipped with such an antenna, the pulses reflected by the filling product are detected, and the distance from the filling product is assessed by measuring the transit time of these pulses. Radar-filling level measuring devices are, for example, used for a continuous level measurement of fluids, as well as of bulk goods or a combination of such products. Radar-filling level measuring devices are, for example, distributed under the trade name "VEGAPULS" by the company VEGA Grieshaber KG.

PRIOR ART

In radar devices having transmitting frequencies of under 8 GHz, basically two different antenna types are actually used. For antennas, which are not exposed to a heavy chemical load, metallic horns (preferably of stainless steel) are used. Thus, reference is made in an exemplary manner to the document DE 94 12 243 U1, which inter alia discloses horn antennas. For devices in highly aggressive surroundings or in applications in which the filling product to be measured for purity reasons is not allowed to get in contact with metal, metallic antennas of the mentioned kind, however, are not appropriate. For this purpose, it is proposed in the mentioned publication to provide a metallic horn antenna with a protective layer, which is corrosion-proof and permeable for microwaves. From the document WO90/13927, a horn antenna with a lens arrangement is moreover known, wherein the horn antenna, as well as the lens consists of a dielectric material such as, for example, polyethylene, polyester, cross-linked polysterol, glass fiber-enforced plastic or syntactic foam. A horn antenna with a filling of dielectric material is further known, for example, from JP 100 41 737, U.S. Pat. No. 4,161,731, and U.S. Pat. No. 4,783,665. By means of the filling consisting of a dielectric material, it is true, an improvement is achieved as compared to the aforementioned horn antennas; the production thereof, however, is still relatively complicated and expensive, and their mechanical stability still remains to be improved. Apart from that, complicated sealing mechanisms are necessary for their attachment.

Metallic horn antennas provided with a protective layer such as they had been initially discussed, cannot be used in the food sector due to their multipart mechanical structure, since here, a good cleanability is often required. In this case, so-called dielectric rod antennas (such as they are, for example, disclosed in the document DE 44 05 855 A1) are used. These are manufactured massive from chemically highly resistant PTFE (Teflon), but have various disadvantages as compared to the horn antennas. Thus, their function can be highly influenced by a condensate present on their surfaces. Due to the large active and mechanical length of such rod antennas, they are only conditionally suited for being built into a fitting of a vessel. Moreover, the performance cannot be enhanced in an arbitrary manner. Finally, the directional characteristic, as well, is less favorable than with a horn antenna.

The higher the selected transmitting frequency, the more important become the previously mentioned problems with rod antennas. Horn antennas, on the contrary, can be used without problems for higher frequencies, they just have to be adapted in their dimensions. With rod antennas namely, the rod thickness is a function of the frequency, it will more and more decrease with higher frequencies. Thus, the rod thickness of a rod antenna in the frequency range of 24 GHz would only be 4 mm (material PTFE), and the antenna would have a minimum length of 200 mm. Such antennas, however, can be easily damaged. Thus, a distortion would result in permanent damage of the antenna, or at least in a change in the antenna properties. Moreover, such antennas are much more sensitive to adherences or condensates, since in addition to the lower frequency, also a smaller surface is available. For materials suited for high frequency, e.g. ceramics, this construction cannot be realized. Due to the higher value, the diameter reduces again.

REPRESENTATION OF THE INVENTION

The technical problem on which the invention is based resides in providing a horn antenna for a radar device, which horn antenna can also be used in environmental conditions of a higher chemical aggressiveness, and at least reduces the hitherto arising disadvantages.

This technical problem is solved by a horn antenna comprising an antenna envelope defining the geometry characterizing a horn antenna. Hence, the antenna envelope delimits a flaring hollow space of the antenna, which space is at least in part filled up with a filling of a dielectric material, the opening of the hollow space of the hollow space of the antenna being closed by the filling towards the filling product present in a vessel. At its outside, the antenna envelope is likewise enveloped by a dielectric material and namely so that the filling of the antenna's hollow space and the coating on the outside in toto screen the antenna envelope against a possibly chemically aggressive atmosphere in a vessel filled with the filling product to be measured.

Preferably, the antenna envelope as a whole, i.e. on its inner and outer side, is embedded in the dielectric material so that the outer encasing of dielectric material in combination with the filling has a stability-increasing effect. The outer encasing, in particular, constitutes preferably a cylindrical base body, or a conical base body tapering towards the filling product.

In a preferred embodiment, the outer encasing encloses also the opening of the hollow space, i.e. it is configured as a unilaterally open pot. A further development of this embodiment provides the radiation surface of the envelope being then configured as a (concave or convex) lens, resulting in the improvement of the radiation characteristic.

In a preferred embodiment, it is provided that the antenna envelope consists of metal, which envelope is then enveloped inside and outside by the dielectric material, and is in particular completely embedded therein. Alternatively, it is also possible to produce the antenna envelope itself from a dielectric material, which antenna envelope then being embedded in another dielectric material. The respective materials then have to be selected with respect to the radiation characteristic.

The invention is based on the idea of filling up, at least in part, the inner space (hollow space) enclosed by the horn antenna with a filling material for stabilizing and increasing the mechanical stability, and of preventing therewith at the same time condensate or such like from penetrating into the hollow space, and moreover, of applying a dielectric filling material also on the outside of the antenna envelope. Through this combination of a dielectric encasing on the inside and the outside, the envelope is protected and of a higher mechanical stability.

Preferably, at least those surfaces of a usual metallic horn antenna are provided with a protective coating, which could come into contact with the chemically aggressive atmosphere in a vessel filled with the filling product to be measured. Therewith, it is achieved that, for one, a horn antenna can now also be used in environmental conditions which hitherto required other types of antennas, and, for another, the pressure support is improved in such atmospheres.

An inventive filling can therewith also act at the same time as a protective layer. In case the filling product has only a mechanically supporting quality, the application of a separate protective layer to those metallic parts or surfaces of the horn antenna is possible, which come in contact with the atmosphere of higher chemical aggressiveness. By filling up the inner antenna space with a filling product, the pressure support is at the same time considerably increased.

The most diverse materials can be used for the filling. From the production-technical point of view, it is extremely advantageous to use, for example, a foam (such as, e.g. ROHACELL) or another material, the e, of which is close to air. In certain applications, however, it is also possible to provide not only the coating but also the filling made of a dielectric material, such as, e.g., PTFE. For a high mechanical and thermal stability, a fiber-enforced synthetic material is recommended such as, e.g., PPS or PP. Such fiber-enforced synthetic materials can also be used in combination with other suitable materials. Thus, the coating can be applied by stoving, sintering or such like. In case the filling is made of a dielectric material, the filling, as well, can of course be manufactured likewise.

When used in explosion-endangered areas, it can be advantageous to coat the dielectric surface of the antenna with a conductive layer such as it is, for example, known from the document DE 196 17 963 A1. By means of such a layer, the electrostatic charging of the horn antenna is prevented.

For simplifying the sealing of such a horn antenna, it is particularly purposeful to apply the envelope of dielectric material also to a flange for the attachment of the horn antenna, namely, on the side directed into the radiation direction of the horn antenna. Thereby, a sealing between the flange and the vessel is achieved in an optimum manner, and the flange is at the same time protected from the chemically aggressive atmosphere within the vessel. Moreover, there is no need to add any separate sealing parts.

Preferably, such a horn antenna for a radar-filling level measuring device hence features an antenna envelope having the geometry characterizing a horn antenna, and being filled up inside, at least in part, with a filling of dielectric material, which closes the opening of the hollow space of the hollow space of the antenna, and which is moreover at the same extended to the side of an attachment flange of the antenna directed into the radiation direction. Preferably, such an antenna is also enveloped outside with the dielectric material, such as it has been initially discussed above.

A preferred embodiment comprises an antenna envelope consisting of metal and having the form of a cylinder, which at its inside is provided with a cone-shaped hollow space passing over into a cylindrical hollow space. Into this cylindrical hollow space extends an exciter pin, which radiates a microwave signal generated in an electronic unit into this hollow space. In the hollow space of the antenna itself, a filling formed from a dielectric material in the form of a cone is present, the tip of which extends into the cylinder-shaped hollow space in the antenna envelope. The cone tip preferably comprises a slightly larger angle inclination than the rest of the filling. Hereby, the radiation characteristic is improved. The angle difference preferably is 2–3 degrees.

According to another aspect of the invention, the inside filling consists of several parts of different dielectric materials. The outside encasing is formed by a part of dielectric material connected with the inside encasing, which part radially extending so far to the outside that it screens a flange situated behind same, which serves for attaching a filling level measuring device from the atmosphere within the vessel, when it is in the attached condition.

It is particularly advantageous to screw the different parts of the filling and the outer encasing with each other, and to bond one or more parts of the inner filling with the antenna envelope by adhesion. Thereby, an optimum radiation is made possible, and at the same time even a high temperature resistance and adaptation to various temperature expansion coefficients is achieved. As the material, in particular PTFE, epoxy resin-bound hollow glass microballs and modified Teflon is used.

It has still to be noted here that of course all of the features and technical details discussed in the present description as to a specific embodiment of the invention can be arbitrarily combined with each other, and can also be used in another embodiment of the invention without problems, taken alone or combined with each other. This will depend on the respective conditions of use and the filling level measuring device.

BRIEF DESCRIPTION OF THE DRAWINGS

For the further explanation and the better understanding, several embodiments of the invention will be described in the following with reference to the attached drawings. Therein show.

DESCRIPTION OF THE EXEMPLARY EMBODIMENT OF THE INVENTION

Figure 1:
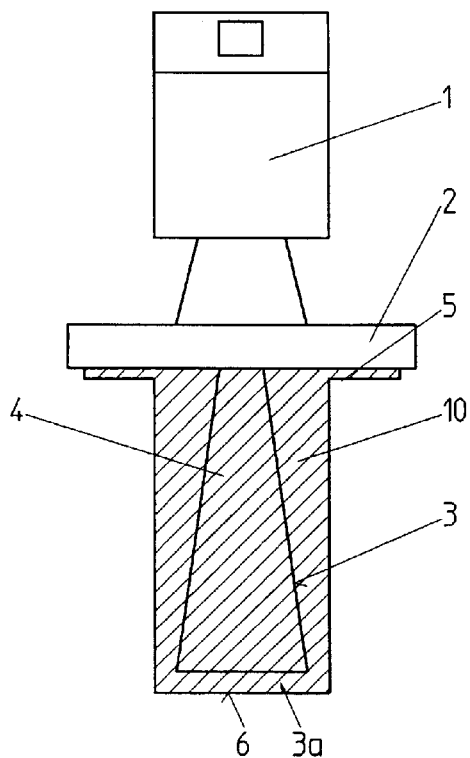
FIG. 1 a schematic side view of a radar-filling level measuring device with a first embodiment of an inventive horn antenna, FIG. 2 a schematic side view of a radar-filling level measuring device with a second embodiment of an inventive horn antenna, FIG. 3 a schematic side view of a radar-filling level measuring device with a further embodiment of an inventive horn antenna, FIG. 4 a schematic side view of the filling level measuring device shown in FIG. 3, which is here placed on a flange of a vessel, FIGS. 5a–5c in each case a schematic side view of a filling level measuring device as it is shown in FIGS. 3 and 4, the radiation opening of the horn antennas in the modification shown here being formed as a specifically configured radiation lens, FIG. 6 a schematic side view of a further embodiment of a horn antenna according to the invention completely made of a dielectric material, FIG. 7 a schematic sectional view of a level measuring device with an inventive horn antenna, and FIG. 8 a schematic sectional view of a further level measuring device with a horn antenna according to a further embodiment of the invention.

The schematic side view of a filling level measuring device 1 shown in FIG. 1 with a radar horn antenna comprises an attachment flange 2 followed by the horn antenna 3. The horn antenna 3 here is made of metal, which is completely enclosed by or embedded in a dielectric material 10. The dielectric material 10 moreover fills up the hollow space 4 of the horn antenna, and forms a cylinder on outside. The horn antenna opening 3a here is closed with the dielectric material 10, and is configured as planar face 6, which is perpendicular to the principal radiation direction of horn antenna 3.

As can be seen from FIG. 1, the coating consisting of dielectric material 10 is likewise formed on attachment flange 2, i.e. that dielectric material 10, which forms per se a cylindrical outer contour around horn antenna 3, protrudes from this outer cylinder by a certain thickness. This flange-type configuration 5 of dielectric material 10, such as can in particular be seen from FIG. 4, creates an excellent sealing towards an attachment flange 12 of a vessel 11.

In the embodiment shown in FIG. 1, a conventional horn antenna 3 can be used, i.e. the horn antenna 3 is made of metal and can be configured in its geometry as a truncated cone, an exponential horn, a rectangular horn, or such like. The dielectric material 10 is, for example, PTFE, PP, PFA. Of course, all other known dielectric materials known in this technical field, can be likewise used. In the embodiment of an inventive horn antenna 3 shown in FIG. 1, the outer coating, as well as the filling of the hollow space 4 of horn antenna 3, are filled and enveloped, respectively, with the same dielectric material 10. Yet, it is of course possible to provide the filling of the hollow space 4 of the horn antenna of a material different from the actual outer coating, which comes in contact with the possibly aggressive environment in the inner space of a vessel.

This means that the filling 4 of the horn antenna 3 could consist of a foam, the dielectric constant of which is close to the dielectric constant of air. With such a foam-like filling, an excellent pressure support could be achieved, a coating made of a dielectric material of the aforementioned kind forming only the outer contour would then offer the protection against the aggressive environment in the inner vessel space. Therewith, the fabrication would be simplified and the production costs for such a horn antenna would be reduced, as well.

Figure 2:
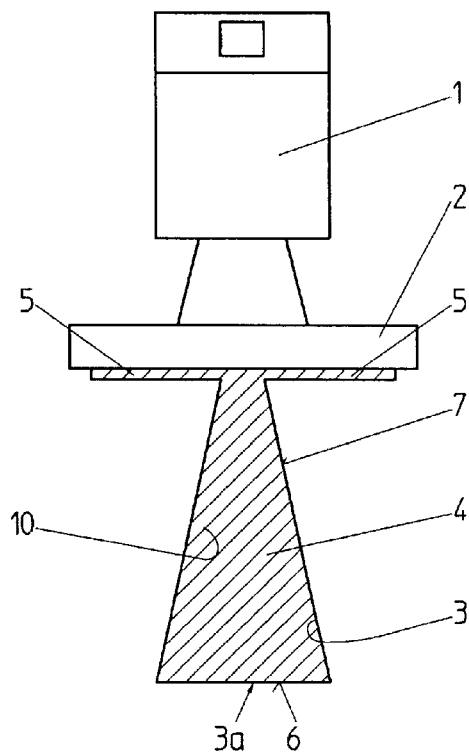

In the alternative embodiment shown in FIG. 2, the horn antenna 3 in toto is formed of a dielectric material 10, the metallic envelope of horn antenna 3 is obtained by applying a conductive layer 7 on the side faces of horn antenna 3. The form of the horn antenna 3 formed of the dielectric material 10, is again configured having an attachment flange 5 on the flange side. The horn antenna radiation opening 3a is configured as a planar surface 6, alike the embodiment of FIG. 1.

This embodiment has the advantage that, despite the somewhat reduced chemical resistance, the entire horn antenna 3 can be produced in a more cost-efficient manner. It has still to be noted here that, if required, the existing metal coating 7 can even be provided with a further protective layer so as to create a further improved horn antenna with a higher resistance. The application of the metal coating 7 on the contour of the horn antenna 3 consisting of a dielectric material 10, can, for example, ensue by vacuum metallization, galvanization, impression or enameling.

Figure 3:
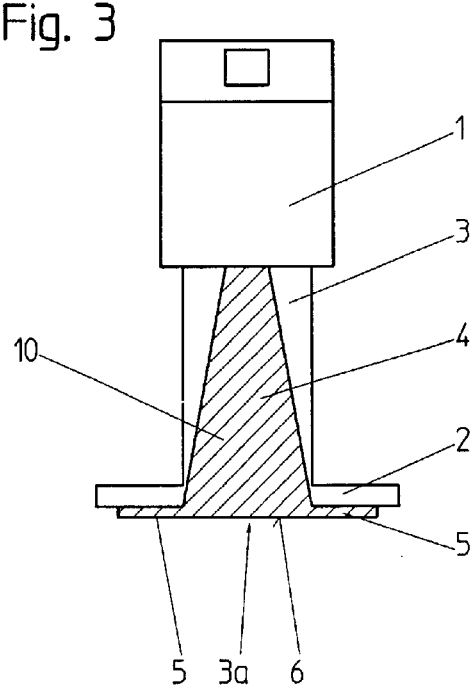

In FIG. 3, a further embodiment of an inventive horn antenna 3 is illustrated, which has a flange-flush construction. Through this construction, the required amount of dielectric material 10 reduces considerably as compared to the construction shown in FIGS. 1 and 2, since the outer surface of the horn antenna 3 does not need to be coated. Only a flange-like layer 5 is necessary on the front side of the horn antenna 3, which serves at the same time as a sealing towards a vessel. Such as has been outlined before, the entire hollow space of the horn antenna 3 is here filled up with the dielectric material 10. Surely, it is again possible, as has been discussed before as to the embodiments according to FIGS. 1 and 2, that the hollow space 4 of horn antenna 3 is filled up with another material, and the dielectric material 10 only comprises the layer forming the radiation surface 6, which layer here serves in addition as a flange sealing. In the embodiment shown in FIG. 3, the radiation surface 6 is likewise of a planar configuration.

Figure 4:
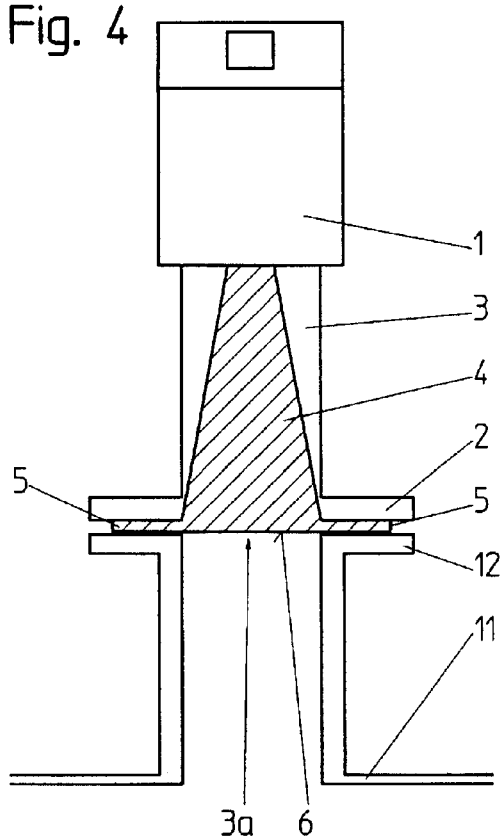

From FIG. 4, the attachment on an attachment flange 12 of a vessel 11 of an inventive horn antenna such as it is shown in FIG. 3 can be schematically seen. The flange-like configuration of the dielectric material 5 here abuts against the flange 12 of vessel 11. By means of screws not shown, which tightly draw the flanges 2 and 12 of the level measuring device 1 and the vessel 11, respectively, against each other, an extremely tight installation of the level measuring device without further separate sealings is possible. The sealed state is here achieved by the layer 5 of dielectric material 10.

From FIGS. 5a–5c can be seen that the radiation surface 6 of an embodiment as per FIGS. 4 or 3 must not necessarily be configured as a planar surface. Same can be formed, as it is shown in FIG. 5a, as a convex lens 6a. Depending on the case of application and the transmitting frequency used in the radar-filling level measuring device, it can be purposeful to configure the radiation surface 6a of a higher or lower convexity. Yet, it is likewise possible, to give radiation surface 6b a concave configuration, as it is shown in FIG. 5b. Another modified embodiment is shown in FIG. 5c. Here, the dielectric material 10 on radiation surface 6c is slightly curved towards the inner receptacle space.

All embodiments are adapted to the respective conditions in an extremely suitable manner in that the dielectric material 10 with the radiation surface 6a–6c is specifically adapted to the frequency used and to the environmental conditions, so that the dielectric material 10 acts like a dielectric lens. It is still noted here that the configuration of the radiation surfaces 6a–6c as dielectric lens in particular allow for an improved dripping off or draining of humidity and condensate from horn antenna 3, which is preferred.

Figure 6:
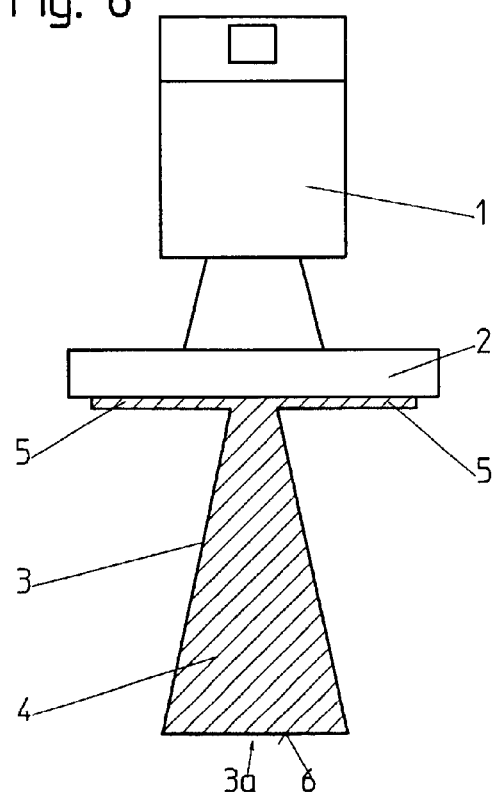

The further embodiment of a horn antenna shown in FIG. 6 is only made of dielectric material 10, the metal envelope of the horn antenna is dispensed of. Due to the material properties, the rear part of the horn antenna 3 acts as an electric waveguide, the radiation of the electromagnetic waves takes place on the radiation surface 6. The entire horn antenna 3 can therewith be produced in one piece. It exhibits the same advantages as a known dielectric rod antenna, however, at dimensions which are significantly more favorable. It namely has a large diameter and therefore a higher mechanical stability.

Figure 7:
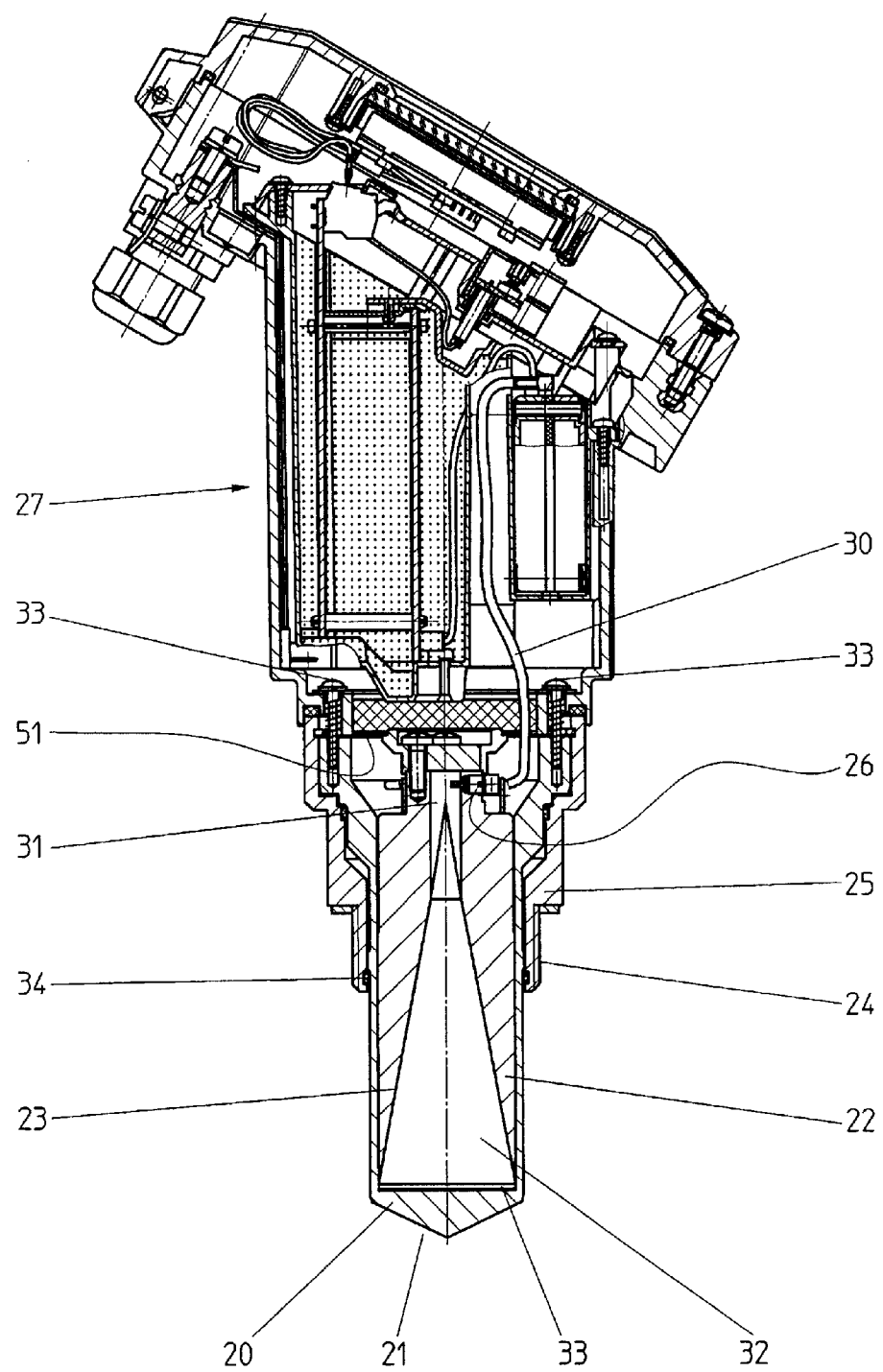

The filling level measuring device according to FIG. 7 schematically shown in a sectional view comprises a housing 27, in which the entire electronic unit of the filling level measuring device is accommodated. This electronic unit corresponds to the state of the art and needs no further explanation here. Via a coaxial cable 30, the microwave signal generated in the electronic unit is guided to an exciter pin 26 leading into a hollow space 31. The exciter pin 26 itself is attached in a metal cylinder 22, which is configured coaxial with hollow space 31 in which terminates exciter pin 26, with a truncated cone-like hollow space tapering off conically towards the exciter pin. This truncated cone-like hollow space then passes over into the cylindrical hollow space 31. Preferably, the metal body 22, which here forms the antenna envelope, is of aluminum. Other materials are, however, also imaginable such as, for example, stainless steel.

The truncated cone-like hollow space within antenna envelope 22 is filled with a cone 32 of synthetic material. This cone 32 has a step in the zone of the transition point from the truncated cone-like hollow space into the cylindrical hollow space 31, so that the tip of cone 32 presents a slightly different angle with respect to the symmetry axis than the rest of the envelope surface. The angle variation is approximately 2 to 3 degrees. At the wider end of cone 32, the cone likewise presents a step introducing a cylinder portion 33.

The antenna envelope 22 and the therein introduced plastic cone 32, are completely enclosed by an encasing 20 of synthetic material, here modified Teflon (polytetraflourethene). Coaxially to the antenna envelope 22, this encasing 20 forms on the radiation surface a convex lens 21. Thereby, the improved radiation characteristics known per se of such an antenna can be achieved. Encasing 20 extends up until far beyond the height in which exciter pin 26 is placed, and is attached on its upper end on a base body by means of screws 33. Above from this encasing 20 consisting of synthetic material, a further sleeve 25 is realized, which is sealed with the encasing 20 via an O-ring 34. By means of a spring disk 51, the antenna envelope 22 is pressed downwards against encasing 20, whereby a temperature-contingent expansion is taken into account.

Hence, a horn antenna 22 is thus for the first time protected on its inside and outside from aggressive atmospheres within vessels, moreover also from possibly high temperatures, and yet the stability of such an antenna is increased at the same time. Moreover, the radiation characteristics are excellent even at small dimensions. As a marginal note, it has to be mentioned, that via a thread 24, the sleeve 25, and therewith the entire filling level measuring device, can be screwed into the screw-in opening of a vessel, and hence only the lower part of the horn antenna protrudes into the vessel but is, however, sealed there from the atmosphere within the vessel due to the encasing 20 and the filling 32.

Figure 8:
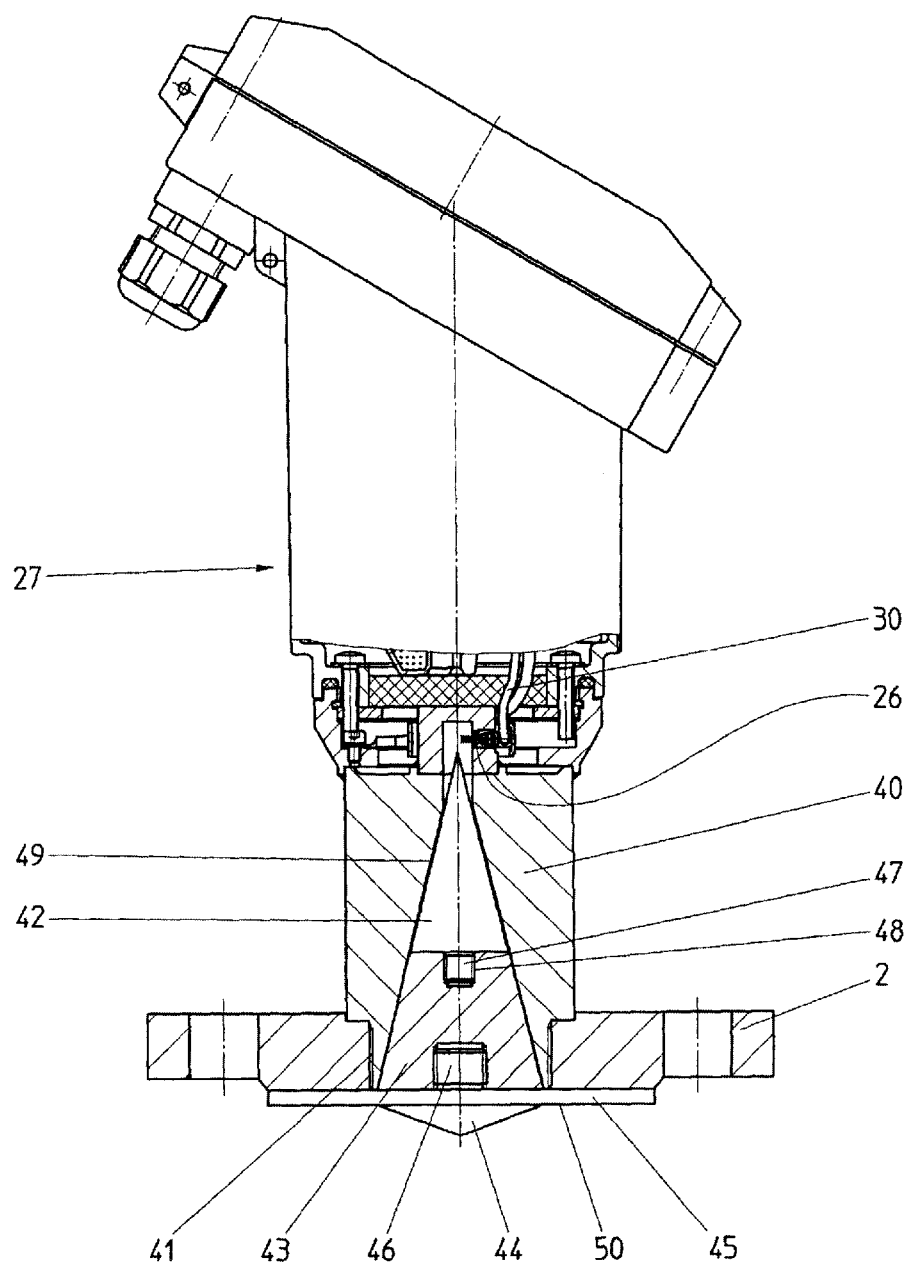

A further embodiment of an inventive horn antenna is shown in the partially cut representation as per FIG. 8. This filling level measuring device again comprises a housing 27, in which the entire electronic unit, which is known per se, is accommodated. The part relevant here, again comprises an antenna body 40 which is outside cylindrical, and coaxially inside provided with a cone-like hollow space. At the upper end of the cone-shaped hollow space follows a cylindrical hollow space into which protrudes an exciter pin 26 connected with the electronic unit via a coaxial cable 30. As discussed above, the microwave signal, which has been generated, is here, as well, guided via coaxial cable 30 to exciter pin 26, from where ensues the transmission to the horn antenna.

At the lower end, antenna body 40, here consisting of stainless steel, is provided with a step comprising a screw thread 41. Via screw thread 41, said body 40 is screwed with a flange 2, here also consisting of stainless steel. As can be inferred from FIG. 8, the cone-shaped hollow space within antenna body 40 is filled by a three-part filling 42, 43, 44. The uppermost filling 42 consists of PTFE (Teflon), and is configured cone-shaped. The tip of this cone part 42 protrudes into the cylindrical hollow space, into which protrudes exciter pin 26, too. On the base part of cone part 42, a pin 47 is formed comprising a male thread 48. The center part 43 of the filling here consists of epoxy resin-bound hollow glass microballs and comprises the shape of a truncated cone. On both base faces, a blind hole is centrically formed, which is in each case provided with a female thread.

The third filling part orientated towards the inner receptacle space is formed towards the receptacle with a convex lens form, followed by a one-part all-over disk 45. The diameter of disk 45 is selected so that it sealingly abuts against the vessel rim on which the filling level measuring device is to be attached. The rear side of disk 45 is again centrically configured with a pin 46 comprising a male thread 50 matching with the female thread of center part 43 of the filling. This third filling part 44, 45 consists of modified Teflon, here in particular of a material available under the designation TFM600.

A flange 2, likewise consisting of stainless steel, is screwed onto antenna body 40 via a thread 41. Flange 2 features passage holes distributed across its circumference, through which the screws will be inserted, by means of which flange 2 can be screwed to a vessel opening. The vessel wall thereby comes to rest on part 45 of filling 44 and therewith provides the sealing effect.

As has been explained above, the three filling parts 42, 43, 44 consisting of three different materials, are screwed to each other. For attaching the entire filling 42, 43, 44, the center part 43 is bonded by adhesion with antenna body 40, in particular by means of a silicone adhesive. The cone-shaped part 42 of the filling features such an outer dimension that between the outer wall of cone 42 and the inner wall of antenna body 40, a minimal gap 49 of about 0.5 mm remains, so that expansion variations conditioned by temperature influences, can be compensated for. Through the specific material selection, for one, an excellent resistance against chemically aggressive atmospheres within the vessel is created, and, for another, an excellent temperature resistance, as well. A device such as represented in FIG. 8 can be used in ambient temperatures of up to 150° C. The inside covering with the specific three-part filling offers an optimum wave propagation, and at the same time a particular temperature resistance and resistance against aggressive media.

All embodiments have the advantage of not only being restricted to radar-filling level measuring devices of higher frequencies; rather such embodiments of radar antennas can be used for devices of all frequencies. Cleaning of the horn antenna 3 can be easily carried out since the surface is one-part, free from sealings, and therewith free from gaps. This fact in particular enables the use also in foodstuff applications without problems.

What is claimed is:

1. A horn antenna for a radar-filling level measuring device having an antenna envelope that comprises an outside, a flaring hollow space, a filling at least in part filling up said hollow space, and having an encasing of dielectric material that encloses the outside of the antenna envelope and closes an opening of the hollow space.

2. The horn antenna according to claim 1, wherein the horn antenna includes a spring element adapted to press the antenna envelope against an inner side of the encasing.

3. The horn antenna according to claim 1, wherein the hollow space is composed of a cone-shaped part and a cylindrical part.

4. The horn antenna according to claim 1, wherein the antenna envelope consists essentially of metal.

5. The horn antenna according to claim 1, wherein the filling includes a free surface having a convex shaping in a radiation direction.

6. The horn antenna according to claim 1, wherein the filling includes a free surface having a concave shaping in a radiation direction.

7. The horn antenna according to any of the preceding claims, further comprising a flange at least in part coated with the dielectric material of the encasing in a radiation direction.

8. The horn antenna according to claim 1, wherein the antenna envelope as a whole consists of a dielectric material.

9. The horn antenna according to claim 1, wherein the filling completely fills the hollow space and includes multiple parts and a radiation surface facing an inner receptacle space.

10. The horn antenna according to claim 9, wherein the radiation surface facing the inner receptacle space extends radially to form a flange attachment adapted to form a seal of the dielectric material.

11. The horn antenna according to claim 1, wherein the filling completely fills the hollow space.

12. The horn antenna according to claim 11, wherein the antenna envelope is configured as a one-part body of the dielectric material.

13. The horn antenna according to claim 1, wherein the antenna envelope includes a conductive coating.

14. The horn antenna according to claim 13, wherein the conductive coating consisting of a PTFE-carbon mixture.

15. A horn antenna for a radar-filling level measuring device having an antenna envelope that comprises an outside, an open end, a flaring hollow space, a multipart filling of dielectric material at least in part filling up said hollow space, and a dielectric outside encasing closing the open end, covering the outside of the antenna envelope and extending radially to have a sealing effect with respect to an inner receptacle space.

16. The horn antenna according to claim 15, wherein the filling comprises a cone-shaped part of PTFE and a part of epoxy resin-bound hollow glass microballs, and said two parts being screwed with each other.

17. The horn antenna according to claim 16, a third part of modified polytetrafluorethene being connected with the filling of dielectric material and closing the hollow space opening with respect to the atmosphere within the inner receptacle space, and extending radially to form a seal with the filling level measuring device in an attached condition.

18. The horn antenna according to claim 17, wherein the third part forming the seal being screwed with the filling.

19. The horn antenna according to claim 15, wherein the antenna envelope includes a circumferential wall, and wherein the filling within the antenna envelope is bonded by adhesion at least across a part of the circumferential wall.

20. The horn antenna according to claim 19, wherein the adhesive bond is a silicone bond.

21. The horn antenna of claim 4, wherein the metal includes at least one of stainless steel, aluminum, and an aluminum alloy.

22. A horn antenna, comprising:
a body including a wall, an interior space, an open end;
a dielectric filling in the interior space;
a dielectric outer coating on an outer surface of the wall; and
a dielectric closure on the open end.

23. The horn antenna of claim 22, wherein the dielectric closure includes a planar face that is perpendicular to a principal radiation direction from the body.

24. The horn antenna of claim 22, wherein one of the dielectric outer coating and the dielectric covering include a sealing flange.

25. The horn antenna of claim 22, wherein the dielectric outer coating includes a first material, the dielectric filling includes a second material, and the first material is different than the second material.

26. The horn antenna of claim 22, wherein the wall of the body tapers, and the dielectric outer coating forms a cylinder.

* * * * *